United States Patent [19]

Schissel et al.

[11] Patent Number: 4,847,351

[45] Date of Patent: Jul. 11, 1989

[54] LIQUID CRYSTALLINE POLYESTERS

[75] Inventors: David N. Schissel, Clifton Park; Matthew E. Langer, Guilderland; Gary W. Yeager, Schenectady, all of N.Y.

[73] Assignee: General Electric Company, Schenectady, N.Y.

[21] Appl. No.: 227,043

[22] Filed: Aug. 1, 1988

[51] Int. Cl.[4] ............................................. C08G 63/60
[52] U.S. Cl. .................................... 528/193; 528/86; 528/176
[58] Field of Search ......................... 528/86, 193, 176

[56] References Cited

U.S. PATENT DOCUMENTS

| | | | |
|---|---|---|---|
| 4,536,561 | 8/1985 | Schmidt et al. | 528/191 |
| 4,617,370 | 10/1986 | Lenz et al. | 528/191 |
| 4,701,515 | 10/1987 | Dicke et al. | 528/176 |
| 4,728,715 | 3/1988 | Kock et al. | 528/193 |

FOREIGN PATENT DOCUMENTS 0201831  5/1986  European Pat. Off. .

OTHER PUBLICATIONS

Patent Letter, "Phenylated p,p'-Biphenylene Polyesters", Holub et al.
European Polymer Journal, vol. 6 (1970), "Synthesis and Properties of Polyesters Based on Substituted Bisphenols", H. B. Weyland et al., pp. 1339–1345.

*Primary Examiner*—Harold D. Anderson
*Assistant Examiner*—T. Mason
*Attorney, Agent, or Firm*—William A. Teoli; James C. Davis, Jr.; William H. Pittman

[57] ABSTRACT

Liquid crystalline polyesters are provided employing 4,4'-dihydroxybiphenyls substituted with organo radicals which are intercondensed with bis(4-hydroxyphenyl)ether, iso- or terphthalic acid, and hydroxybenzoic acid. The liquid crystalline polyesters have been found to have improved processing characteristics.

9 Claims, No Drawings

LIQUID CRYSTALLINE POLYESTERS

BACKGROUND OF THE INVENTION

The present invention relates to liquid crystalline polyesters resulting from the intercondensation of bis(4-hydroxyphenyl)ether, 4,4'-dihydroxypolyorganosubstituted biphenyl, and hydroxybenzoic acid which are further intercondensed with terephthalic acid, or isophthalic acid or mixtures of terephthalic acid and isophthalic acid. More particularly, the present invention relates to liquid crystalline polyester compositions exhibiting improved processing and melt flow characteristics.

Prior to the present invention, some commercially available liquid crystalline polyester compositions consisted of intercondensed hydroxybenzoic acid, 4,4'-biphenol, and terephthalic acid. Although these polyesters exhibit high heat resistance, they require a temperature of above 400° C. to process. Another commercially available liquid crystalline polyester composition having improved processing capabilities consists of intercondensed hydroxynaphthoic acid, and hydroxybenzoic acid. It would be desirable, therefore, to provide additional liquid crystalline polyesters with improved processing characteristics and oxidative stability as well as valuable physical characteristics in both the filled and unfilled state.

SUMMARY OF THE INVENTION

The present invention is based on the discovery that polyesters consisting essentially of intercondensed biphenylbisoxy units of the formula,

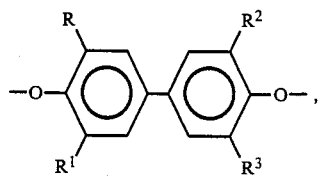

(1)

diphenyletherbisoxy units of the formula,

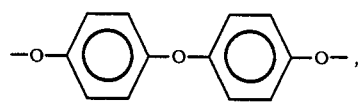

(2)

oxybenzoyl units of the formula,

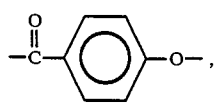

(3)

and aryldicarbonyl units of the formula,

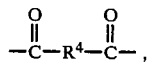

(4)

exhibit anisotropic properties and processing temperature of about 360° C., and valuable physical characteristics, both in the filled and unfilled state, where R, $R^1$, $R^2$, and $R^3$ are monovalent radicals selected from the class consisting of hydrogen, $C_{(1-14)}$ monovalent hydrocarbon radicals, and $C_{(1-14)}$ monovalent hydrocarbon radicals substituted with radicals inert during intercondensation where the $R-R^3$ radicals are present as a mixture of the same or different monovalent radicals having from 0 to 3 hydrogen radicals, and $R^4$ is a $C_{(6-14)}$ divalent arylene radical selected from divalent arylene radicals having valence bonds in either the para or meta position.

STATEMENT OF THE INVENTION

There is provided by the present invention a liquid crystalline polyester consisting essentially of 5 to 15 mole % of biphenylbisoxy units of formula (1), intercondensed with 15 to 5 mole % of diphenyletherbisoxy units of formula (2), 40 to 80 mole % of oxybenzoyl units of formula (3), and 10 to 30 mole % of aryldicarbonyl units of formula (4), based on the total moles of units in formulas (1), (2), (3), and (4).

Radicals included by $R-R^3$ of formula (10 are, for example, $C_{(1-8)}$ alkyl radicals such as methyl, ethyl, propyl, butyl, pentyl, hexyl; $C_{(6-14)}$ aryl radicals such as phenyl, tolyl, xylyl, naphthyl, anthryl, halophenyl, nitrophenyl; radicals included within $R^4$ are, for example, para-phenylene and meta-phenylene.

Some of the 4,4'-dihydroxy polyorgano-substituted biphenyls which can provide formula (1) units are, for example, 4,4'-dihydroxy-3,3'-diphenylbiphenyl, 4,4'-dihydroxy-3,3'-dimethylbiphenyl, 4,4'-dihydroxy-3-phenylbiphenyl, and 4,4'-dihydroxy-3-methylbiphenyl.

Procedures for making these 4,4'-dihydroxy polyorgano-substituted biphenyls are shown by Hay, U.S. Pat. No. 3,631,208, which is incorporated herein by reference. Preferably, $R-R^3$ are monovalent radicals selected from a mixture of hydrogen, and $C_{(1-14)}$ monovalent hydrocarbon radicals as previously defined.

In the practice of the preferred form of the present invention, the liquid crystalline polyester compositions can be prepared in diphenyl ether solvent by a transesterification reaction. Intercondensation can be facilitated between the corresponding bisacetoxybiphenyl precursor of formula (1) units, the bis(acetoxyphenyl)ether precursor of formula (2) units, acetoxybenzoic acid, and either isophthalic acid, or terephthalic acid, or mixtures thereof. The transesterification reaction also can be carried out directly in the melt in the absence of a solvent. Polymerization of the polyester can be effected by continuous removal of acetic acid by distillation as it is formed. At the completion of the reaction, diphenyl ether also can be removed by distillation. Temperatures during the esterification reaction can be from 220° C. to 400° C., and preferably 280° C. to 360° C. The final stages of the reaction can be run under vacuum to ensure removal of all acetic acid and diphenyl ether.

Liquid crystalline polyesters made in accordance with the invention have been found to be insoluble in such solvents as chloroform, methylene chloride, toluene, trichlorobenzene, dichlorobenzene, and 1,1,2,2-tetrachloroethane. The polyesters also have been found to be slightly soluble in meta-cresol, or mixtures of meta-cresol, and up to 20% dichlorobenzene. The liquid crystalline polyesters have been found to be soluble in pentafluorophenol at 60° C.

In order that those skilled in the art will be better able to practice the present invention, the following examples are given by way of illustration and not by way of limitation. All parts are by weight.

EXAMPLE 1

A mixture of ingredients capable of providing units within the scope of formulas 1–4 was heated under nitrogen with continuous stirring at a temperature of 280° C. or 2 1/2 hours consisting of 10.81 grams (60 mmol) of 4-acetoxybenzoic acid, 3.32 grams (20 mmol) of isophthalic acid, 4.22 grams (10 mmol) of 4,4'-diacetoxy-3,3'-diphenylbiphenyl, and 2.86 grams (10 mmol) of bis(4-acetoxyphenyl)ether. During the heating period, acetic acid was continuously distilled off from the mixture. The mixture was the allowed to cool to room temperature and pulverized. The mixture was then placed under high vacuum for one hour at room temperature and then heated while maintaining the vacuum to a temperature of from 215° C. to 278° C. over 48 hours. The mixture was then allowed to cool to room temperature and the vacuum was released under nitrogen. The resulting product was analyzed by DSC and hot-stage polarized light microscopy. Based on method of preparation, the product was a polyester consisting essentially of chemically combined units of formulas (1–4).

In accordance with the above procedure, a mixture of 21.60 grams (120 mmol) of 4-acetoxybenzoic acid, 6.64 grams (40 mmol) of terephthalic acid, 8.4 grams (20 mmol) of 4,4'-diacetoxy-3,3'-diphenylbiphenyl, and 5.72 grams (20 mmol) of bis(4-acetoxyphenyl)ether was heated under nitrogen with continuous stirring at a temperature of 290° C. for 2.5 hours. During the period of heating, acetic acid was continuously distilled from the mixture. The reaction mixture was then allowed to cool to room temperature, pulverized, and then placed under high vacuum while being heated from 200° C. to 275° C. over a 44-hour period, and then 275° C. for an additional 24 hours. The mixture was then allowed to cool to room temperature and the vacuum was released under nitrogen. Based on method of preparation, there was obtained a polyester consisting essentially of chemically combined units within the scope of formulas 1–4. The resulting polyester was analyzed by DSC and hot-stage polarized light microscopy. The following results were obtained, where composition (a) utilized isophthalic acid, and composition (b) utilized terephthalic acid:

| Composition | 4,4'-diacetoxy-3',3'-diphenyl-biphenyl | bis(4-acetoxy-phenyl)ether | Tg | Tm |
|---|---|---|---|---|
| (a) | 10% | 10% | 166° C. | 335° C. |
| (b) | 10% | 10% | 127° C. | 331° C. |

Compositions (a) and (b) above were found to be anisotropic while in the molten state.

Composition (b), containing intercondensed terephthalic acid, was then injection molded to provide some physical property data. The following results were obtained:

| | Neat Polymer | 30% Glass-filled Polymer |
|---|---|---|
| Izod Strength (kg cm/cm) | 13 | 8 |
| Flexural Strength (kg/cm$^2$) | 1700 | 2120 |
| Flexural Modulus (kg/cm$^2$) | 77,000 | 125,000 |

EXAMPLE II

In accordance with the procedure of Example I, 10.80 grams (60 mmol) of 4-acetoxybenzoic acid, 3.32 grams (20 mol) of isophthalic acid, 2.98 grams (10 mmol) of 4,4'-diacetoxy-3,3'-dimethylbiphenyl, and 2.86 grams (10 mmol) of bis(4-acetoxyphenyl)ether was heated under nitrogen with stirring at 280° C. for three hours. During the period of heating, acetic acid was continuously distilled from the mixture. The mixture was then allowed to cool to room temperature and the resulting product was pulverized. The product was then placed under high vacuum and heated from 220° C. to 280° C. for 48 hours, and then at 280° C. for an additional eight hours. The mixture was then allowed to cool to room temperature and the vacuum was released under nitrogen. Based on method of preparation, the resulting product was a polyester consisting essentially of chemically combined units with the scope of formulas (1)-(4).

Following the same procedure, a mixture of 10.80 grams (60 mmol) of 4-acetoxybenzoic acid, 3.32 grams (20 mmol) of terephthalic acid, 2.98 grams (10 mmol) of 4,4'-diacetoxy-3,3'-dimethylbiphenyl, and 2.86 grams (10 mmol) of bis(4-acetoxyphenyl)ether was heated under nitrogen with continuous stirring at a temperature of 280° C. for three hours. During the heating period, acetic acid was continuously distilled from the mixture. The reaction vessel was then allowed to cool to room temperature and the resulting product was pulverized. The product was then placed under high vacuum and heated to from 220° C. to 280° C. over 48 hours and at 284° C. for an additional eight hours. Based on method of preparation, there was obtained a polyester consisting essentially of chemically combined units within the scope of formulas (1–4).

The resulting polyesters of (c) containing chemically combined isophthalic acid, and (d) containing chemically combined terephthalic acid, were then examined by differential scanning calorimetry and the following results were obtained:

| Composition | 4,4'-diacetoxy-3',3'-dimethyl-biphenyl | bis(4-acetoxy-phenyl)ether | Tg | Tm |
|---|---|---|---|---|
| (c) | 10% | 10% | 119° C. | 340° C. |
| (d) | 10% | 10% | 115° C. | 351° C. |

Compositions (c) and (d) were found to be anisotropic in the molten state when examined by hot stage polarized light microscopy.

Although the above examples are directed to only a few of the very many polyesters which can be made in accordance with the practice of the present invention, the present invention is directed to a much broader variety of polyesters as shown in the description preceding these examples and exemplified by formulas (1–4).

What is claimed and sought to be protected by Letters Patent of the United States is as follows:

1. A liquid crystalline polyester consisting essentially of a mixture of 5 to 15 mole % of biphenylbisoxy units of the formula

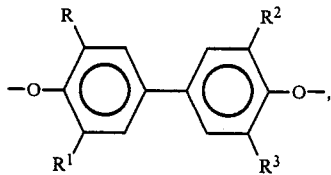

and 15 to 5 mole % of diphenyletherbisoxy units of the formula

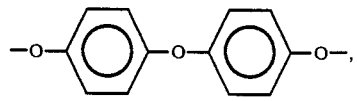

condensed with a mixture of 40 to 80 mole % of oxybenzoyl units of the formula

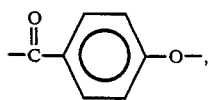

and 10 to 30 mole % of aryldicarbonyl units of the formula

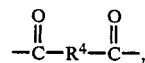

based on the total moles of formulas (1), (2), (3), and (4) units, where R, $R^1$, $R^2$, and $R^3$ are monovalent radicals selected from the class consisting of hydrogen, $C_{(1-14)}$ monovalent hydrocarbon radicals, and $C_{(1-14)}$ monovalent hydrocarbon radicals substituted with radicals inert during intercondensation where the R–$R^3$ radicals are present as a mixture of the same or different monovalent radicals having from 0 to 3 hydrogen radicals, and $R^4$ is a $C_{(6-14)}$ divalent arylene radical selected from divalent arylene radicals having valence bonds in either the para or meta position.

2. A liquid crystalline polyester in accordance with claim 1, wherein R and $R^2$ are phenyl.

3. A liquid crystalline polyester in accordance with claim 1, wherein R and $R^2$ are methyl.

4. A liquid crystalline polyester in accordance with claim 1, where $R^4$ is a para-phenylene radical.

5. A liquid crystalline polyester in accordance with claim 1, where $R^4$ is a metaphenylene radical.

6. A liquid crystalline polyester in accordance with claim 1, consisting of 60 mole percent of oxybenzoyl units, chemically combined with 20 mol percent of isophthalic acid units, 10 mol percent of diphenyletherbisoxy units and 10 mol percent of diphenylbiphenyl bisoxy units.

7. A liquid crystalline polyester in accordance with claim 1, consisting of 60 mole percent of oxybenzoyl units, chemically combined with 20 mol percent of terephthalic acid units, 10 mol percent of diphenyletherbisoxy units and 10 mol percent of diphenylbiphenyl bisoxy units.

8. A liquid crystalline polyester in accordance with claim 1, consisting of 60 mole percent of oxybenzoyl units, chemically combined with 20 mol percent of isophthalic acid units, 10 mol percent of diphenyletherbisoxy units and 10 mol percent of dimethylbiphenyl bisoxy units.

9. A liquid crystalline polyester in accordance with claim 1, consisting of 60 mole percent of oxybenzoyl units, chemically combined with 20 mol percent of terephthalic acid units, 10 mol percent of diphenyletherbisoxy units and 10 mol percent of dimethylbiphenyl bisoxy units.

* * * * *